United States Patent
Chae et al.

(10) Patent No.: US 11,798,134 B2
(45) Date of Patent: Oct. 24, 2023

(54) IMAGE PROCESSING DEVICE, IMAGE PROCESSING METHOD, AND IMAGE PROCESSING PROGRAM

(71) Applicant: Rakuten Group, Inc., Tokyo (JP)

(72) Inventors: Yeongnam Chae, Tokyo (JP); Jiu Xu, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/470,309

(22) PCT Filed: Jun. 5, 2017

(86) PCT No.: PCT/JP2017/020845
§ 371 (c)(1),
(2) Date: Jun. 17, 2019

(87) PCT Pub. No.: WO2018/225134
PCT Pub. Date: Dec. 13, 2018

(65) Prior Publication Data
US 2019/0333191 A1    Oct. 31, 2019

(51) Int. Cl.
*G06T 5/00* (2006.01)
*G06T 5/50* (2006.01)

(52) U.S. Cl.
CPC ............... *G06T 5/002* (2013.01); *G06T 5/50* (2013.01)

(58) Field of Classification Search
CPC .. C07H 5/02; C07H 1/06; A23L 27/37; C07C 231/24; C07C 233/03; G06T 5/002; G06T 5/50; G06T 7/00
See application file for complete search history.

(56) References Cited

U.S. PATENT DOCUMENTS

| | | | |
|---|---|---|---|
| 9,591,240 B1* | 3/2017 | Barbu | H04N 23/74 |
| 2010/0073466 A1* | 3/2010 | Jones | H04N 13/31 |
| | | | 348/51 |
| 2012/0206630 A1* | 8/2012 | Nguyen | G06T 5/003 |
| | | | 348/241 |
| 2015/0181083 A1* | 6/2015 | Kajiwara | H04N 1/41 |
| | | | 358/3.05 |
| 2016/0287116 A1* | 10/2016 | He | A61B 5/055 |

(Continued)

OTHER PUBLICATIONS

International Preliminary Report on Patentability with a Translation of Written Opinion in International Application No. PCT/JP2017/020845, dated Dec. 19, 2019.

(Continued)

*Primary Examiner* — Charles N Appiah
*Assistant Examiner* — Nicole M Louis-Fils
(74) *Attorney, Agent, or Firm* — Sughrue Mion, PLLC (57) ABSTRACT

An image processing device according to one embodiment includes an acquisition unit, a generation unit, a calculation unit, and an estimation unit. The acquisition unit acquires an input image. The generation unit generates a plurality of comparison images by superimposing each of a plurality of noises with different densities from each other on a target region being at least part of the input image. The calculation unit calculates, for each of the plurality of comparison images, the degradation level of the comparison image with respect to the input image. The estimation unit estimates the noise level of the input image based on a plurality of calculated degradation levels.

2 Claims, 8 Drawing Sheets

(56) References Cited

U.S. PATENT DOCUMENTS

| | | | |
|---|---|---|---|
| 2017/0132763 A1* | 5/2017 | Salvador Marcos | ........................ G06K 9/6218 |
| 2017/0213321 A1* | 7/2017 | Matviychuk | ......... G06K 9/6215 |
| 2018/0158176 A1* | 6/2018 | Hung | ...................... G06T 5/002 |
| 2019/0122366 A1* | 4/2019 | Algarni | .................... G06T 7/12 |

OTHER PUBLICATIONS

Kenji Kamimura et al., "Evaluation and Improvement of Noise Estimation from a Single Image", The journal of the Institute of Image Information and Television Engineers, 2009, pp. 101-104, vol. 63, No. 1.

International Search Report for PCT/JP2017/020845 dated Aug. 22, 2017 [PCT/ISA/210].

* cited by examiner

IMAGE PROCESSING DEVICE, IMAGE PROCESSING METHOD, AND IMAGE PROCESSING PROGRAM

CROSS REFERENCE TO RELATED APPLICATIONS

This application is a National Stage of International Application No. PCT/JP2017/020845 filed Jun. 5, 2017.

TECHNICAL FIELD

One aspect of the present invention relates to an image processing device, an image processing method, and an image processing program.

BACKGROUND ART

To process an image containing noise, it is necessary to estimate the noise level in advance. The technique disclosed in Non Patent Literature 1 makes actual measurements of a camera to be used for taking images and thereby constructs a noise model in consideration of the camera characteristics.

CITATION LIST

Non Patent Literature

NPL1: Kenji Kamimura, Hitomi Ito, Norimichi Tsumura, Toshiya Nakaguchi, and Yoichi Miyake, "Evaluation and Improvement of Noise Estimation from a Single Image", The journal of the Institute of Image Information and Television Engineers, Vol. 63, No. 1, pp. 101-104, 2009

SUMMARY OF INVENTION

Technical Problem

In the technique disclosed in Non Patent Literature 1, it is necessary to model the relationship between the camera characteristics and the noise level in advance. Therefore, it is not possible to estimate the noise level unless obtaining prior information such as a noise model or camera information. It is thus desirable to estimate the noise level of an input image without prior information.

Solution to Problem

An image processing device according to one aspect of the present invention includes an acquisition unit configured to acquire an input image, a generation unit configured to generate a plurality of comparison images by superimposing each of a plurality of noises with different densities from each other on a target region being at least part of the input image, a calculation unit configured to calculate, for each of the plurality of comparison images, a degradation level of the comparison image with respect to the input image, and an estimation unit configured to estimate a noise level of the input image based on a plurality of calculated degradation levels.

An image processing method according to one aspect of the present invention is an image processing method performed by an image processing device including a processor, the method including an acquisition step of acquiring an input image, a generation step of generating a plurality of comparison images by superimposing each of a plurality of noises with different densities from each other on a target region being at least part of the input image, a calculation step of calculating, for each of the plurality of comparison images, a degradation level of the comparison image with respect to the input image, and an estimation step of estimating a noise level of the input image based on a plurality of calculated degradation levels.

An image processing program according to one aspect of the present invention causes a computer to execute an acquisition step of acquiring an input image, a generation step of generating a plurality of comparison images by superimposing each of a plurality of noises with different densities from each other on a target region being at least part of the input image, a calculation step of calculating, for each of the plurality of comparison images, a degradation level of the comparison image with respect to the input image, and an estimation step of estimating a noise level of the input image based on a plurality of calculated degradation levels.

In the above-described aspects, a plurality of comparison images are obtained by superimposing a plurality of noises on an input image. The input image is not substantially degraded when noise with lower density than inherent noise of the input image is superimposed on the input image. On the other hand, the input image is degraded when noise with higher density than inherent noise of the input image is superimposed on the input image. With use of such characteristics related to noise, by generating a plurality of comparison images from an input image and estimating the noise level of the input image using those comparison images, it is possible to estimate the noise level of the input image without prior information.

Advantageous Effects of Invention

According to one aspect of the present invention, it is possible to estimate the noise level of an input image without prior information.

DESCRIPTION OF EMBODIMENTS

An embodiment of the present invention is described hereinafter with reference to the attached drawings. Note that, in the description of the drawings, the same elements are denoted by the same reference symbols and redundant description thereof is omitted.

Overview

An image processing device 10 according to an embodiment is a computer or a computer system that objectively estimates the noise level of an image.

"Image" is an image where an object is fixed on a certain medium so that it is perceivable by human eyes. The image becomes visually perceivable by processing data indicating an image (image data), which can be processed by a computer. To be specific, the image becomes visually perceivable by being recorded in a storage device such as a memory and output to an output device such as a monitor by processing of a processor. The image may be a still image or each frame that forms a moving image.

"Noise" is unnecessary data or data irregularities contained in an image, which is one of factors that degrade the image quality. "Noise level" is an index indicating how much noise an image contains. In this embodiment, the noise level is represented by the standard deviation $\sigma$ of the Gaussian noise, which is one type of random noise, as an example. The Gaussian noise can be represented as $N(a,\sigma)$, using the average a and the standard deviation $\sigma$.

Figure 1:
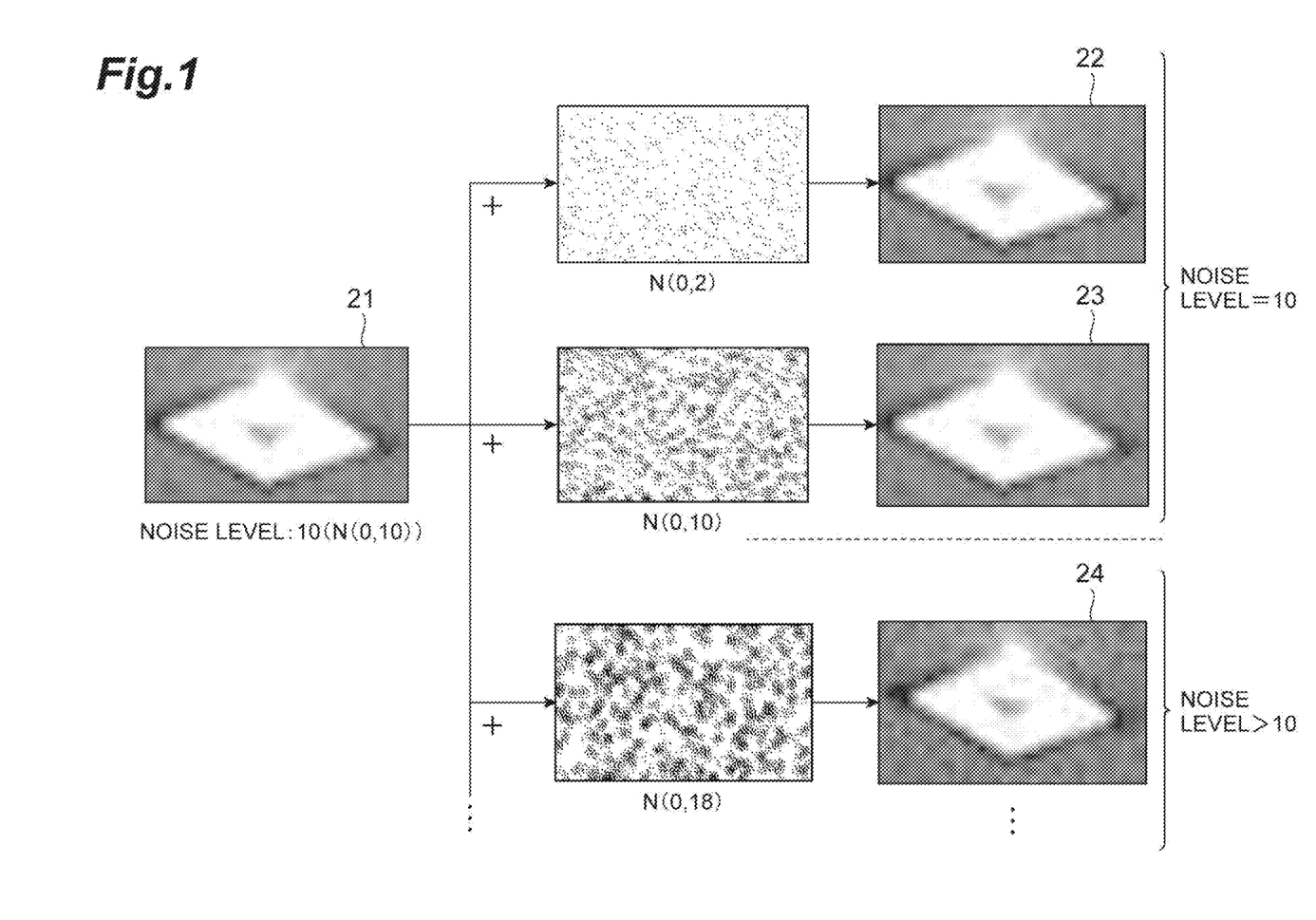
FIG. 1 is a view showing the concept of estimation of a noise level in an embodiment.

FIG. 1 is a view showing the concept of estimation of the noise level in this embodiment. In this example, it is assumed that an image processing device 10 estimates the noise level of an input image 21 whose actual noise level is 10 (which corresponds to the Gaussian noise $N(0,10)$). First, the image processing device 10 generates a plurality of comparison images by superimposing a plurality of noises with different densities from each other on the input image 21. The "density" of noise is an index indicating the amount or intensity of noise. As the density is higher, noise is more intense and appears more clearly on an image. In this embodiment, the image processing device 10 superimposes random noise (noise that appears randomly all over an image) on the input image 21. To be more specific, the image processing device 10 superimposes the Gaussian noise, which is one type of random noise, on the input image 21. In this embodiment, the density of random noise is also referred to simply as "noise density". In the Gaussian noise, the noise density is represented by the standard deviation $\sigma$, and therefore the noise density is higher as the standard deviation $\sigma$ is higher.

In the example of FIG. 1, the image processing device 10 superimposes the Gaussian noise $N(0,2)$ on the input image 21 and thereby generates a comparison image 22. Further, the image processing device 10 superimposes the Gaussian noise $N(0,10)$ on the input image 21 and thereby generates a comparison image 23, and superimposes the Gaussian noise $N(0,18)$ on the input image 21 and thereby generates a comparison image 24. In this manner, the image processing device 10 generates comparison images while changing the noise density (for example, while changing the standard deviation to 26, 34, etc.). Note that, in FIG. 1, each Gaussian noise is schematically represented by a collection of dots.

When noise is contained in an image that should be clear, the image quality is initially low. The image quality is the quality of appearance of an image, and it is determined by various factors such as resolution, tone and contrast. The presence or absence of noise is one of such factors, and the image quality is degraded when the image contains noise. When the noise density to be superimposed is equal to or less than the inherent noise density of the original image, the image quality is not substantially degraded even if the random noise is superimposed. Thus, in this case, the image quality of the comparison image is the same or substantially the same as that of the original image. On the other hand, when the noise density to be superimposed is more than the inherent noise density of the original image, the image quality of the comparison image becomes lower than that of the original image.

In the example of FIG. 1, it is assumed that the noise level of the input image 21 is 10, which corresponds to the Gaussian noise $N(0,10)$. Assume the case where the input image 21 is obtained by superimposing the Gaussian noise $N(0,10)$ on an image not containing any noise. In this case, the noise level of the comparison image 22 obtained by superposition of the Gaussian noise $N(0,2)$ is also 10. Further, the noise level of the comparison image 23 obtained by superposition of the Gaussian noise $N(0,10)$ is also 10. However, because the Gaussian noise $N(0,18)$ has higher density than the inherent Gaussian noise $N(0,10)$ of the input image 21, the noise level of the comparison image 24 obtained by superposition of the Gaussian noise $N(0,18)$ is higher than 10 (for example, the noise level becomes 18). The noise level of the comparison image is also higher than 10 when the standard deviation of the Gaussian noise is further increased. Therefore, the noise level of the input image 21 is assumed to be 10, or a value between 10 to 18.

In this manner, the image processing device 10 generates a plurality of comparison images by superimposing a plurality of noises on an original image and determines the degree of deterioration of the image quality of those comparison images, and thereby estimates the noise level of the original image.

Configuration of Device

Figure 2:
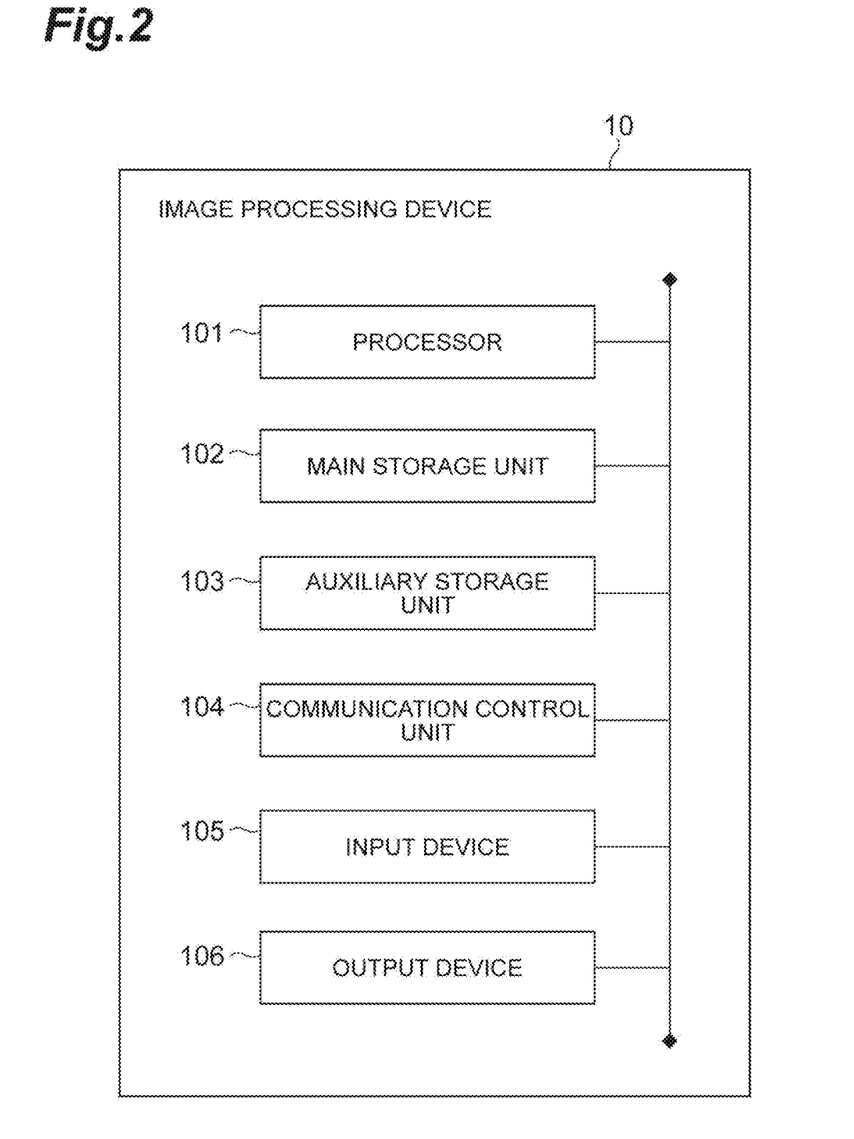
FIG. 2 is a view showing the hardware configuration of an image processing device according to the embodiment.

FIG. 2 shows a typical hardware configuration of the image processing device 10. The image processing device 10 includes a processor 101 that runs an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a monitor.

The functional elements of the image processing device 10 are implemented by loading given software (for example, an image processing program P1, which is described later) onto the processor 101 or the main storage device 102 and running the program. The processor 101 makes the communication control device 104, the input device 105 or the output device 106 operate in accordance with the software, and reads and writes data to and from the main storage device 102 or the auxiliary storage device 103. Data or databases required for the processing are stored in the main storage device 102 or the auxiliary storage device 103.

The image processing device 10 may be composed of a single computer or a plurality of computers. In the case of using a plurality of computers, those computers are connected through a communication network such as the Internet or an intranet, and thereby one image processing device 10 is logically constructed.

Figure 3:
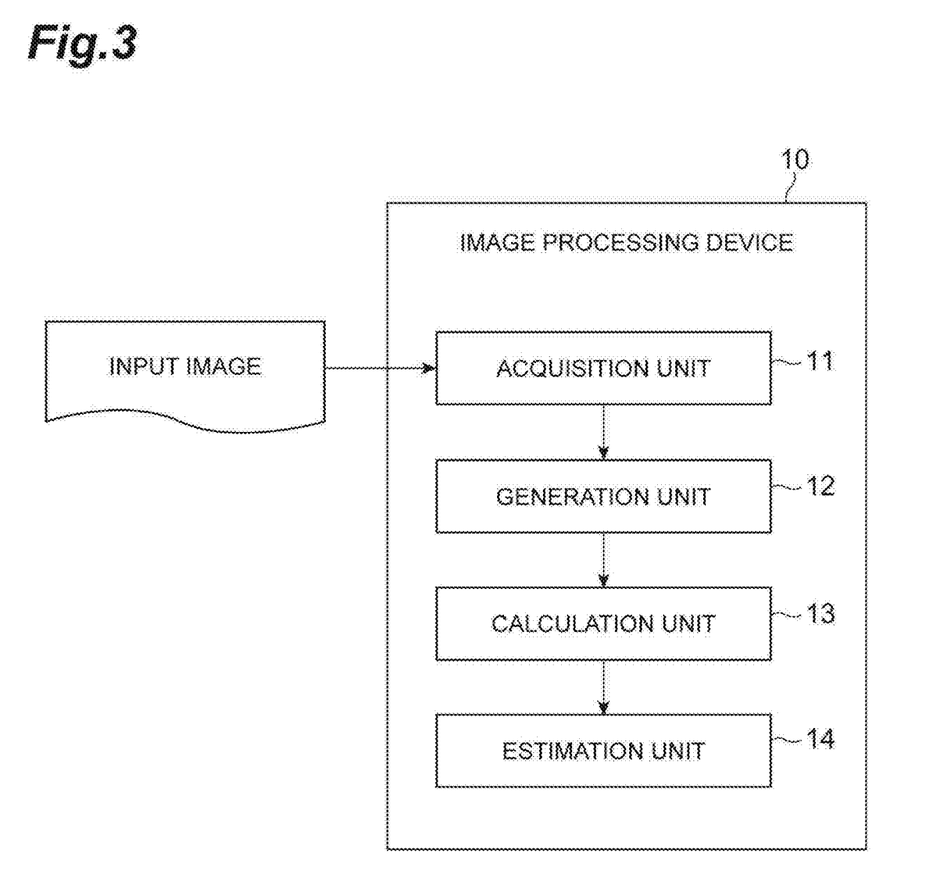
FIG. 3 is a view showing the functional configuration of the image processing device according to the embodiment.

FIG. 3 shows the functional configuration of the image processing device 10. In this embodiment, the image processing device 10 includes an acquisition unit 11, a generation unit 12, a calculation unit 13, and an estimation unit 14 as functional elements.

The acquisition unit 11 is a functional element that acquires an input image. The input image is an image to be processed to estimate the noise level thereof. The input image may be referred to as an original image.

The generation unit 12 is a functional element that generates a plurality of comparison images to be used to estimate the noise level of the acquired input image. The generation unit 12 obtains a comparison image by setting at least part of the input image as a target region and superimposing random noise on the target region. The comparison image is an image obtained by intentionally degrading the image quality of the input image. Note that, however, there is a case where the noise level contained in the comparison image is the same or substantially the same as that in the input image as described above with reference to FIG. 1. The "target region" is a range composed of pixels arranged in a row. The target region may be only part of the input image or the whole of the input image.

The calculation unit 13 is a functional element that calculates, for each of the plurality of comparison images obtained by the generation unit 12, the degradation level of the comparison image with respect to the input image. Thus, the calculation unit 13 obtains a plurality of degradation levels for one input image. The "degradation level" is an index indicating how much the image quality of the comparison image is degraded compared with the image quality of the input image due to the effect of random noise. The calculation unit 13 outputs the plurality of calculated degradation levels to the estimation unit 14.

The estimation unit 14 is a functional element that estimates the noise level of the input image based on a plurality of calculated degradation levels.

Operation of Device

The operation of the image processing device 10 and an image processing method according to this embodiment are described hereinafter with reference to FIGS. 4 to 7.

Figure 4:
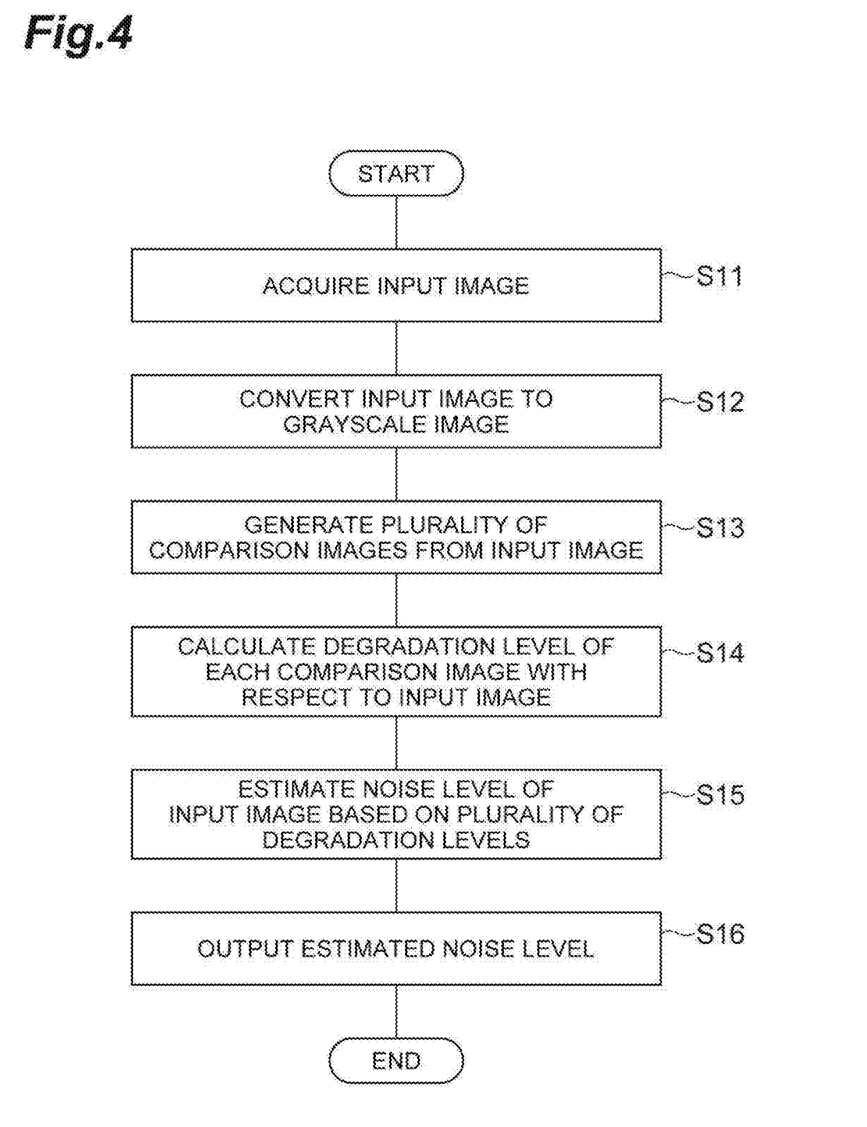
FIG. 4 is a flowchart showing a process in the image processing device according to the embodiment.

FIG. 4 is a flowchart showing a process in the image processing device 10. First, the acquisition unit 11 acquires one input image (Step S11, acquisition step). A method of acquiring the input image is not particularly limited. For example, the acquisition unit 11 may acquire the input image by accessing an image database that stores arbitrary images. Note that the image database may be a separate device from the image processing device 10 or may be part of the image processing device 10. Alternatively, the acquisition unit 11 may acquire the input image input or designated by a user of the image processing device 10. Alternatively, the acquisition unit 11 may receive the input image from another computer.

The acquisition unit 11 then converts the input image to a grayscale image (Step S12). The grayscale image is an image whose pixel value does not contain information other than the luminous intensity. Because the Gaussian noise superimposed on the input image does not have color information, it is possible to obtain the noise level more accurately by converting the input image to the grayscale image in accordance with the Gaussian noise.

After that, the generation unit 12 generates a plurality of comparison images from the input image (Step S13, generation step). The generation unit 12 generates one comparison image as follows. The generation unit 12 reproduces the input image converted into grayscale and thereby obtains an input image for generating a comparison image (which is also referred to hereinafter simply as "input image"). Then, the generation unit 12 sets at least part of this input image as a target region, reduces the image quality of the target region and thereby obtains a comparison image. The generation unit 12 obtains the comparison image by superimposing the Gaussian noise on the target region.

Figure 5:
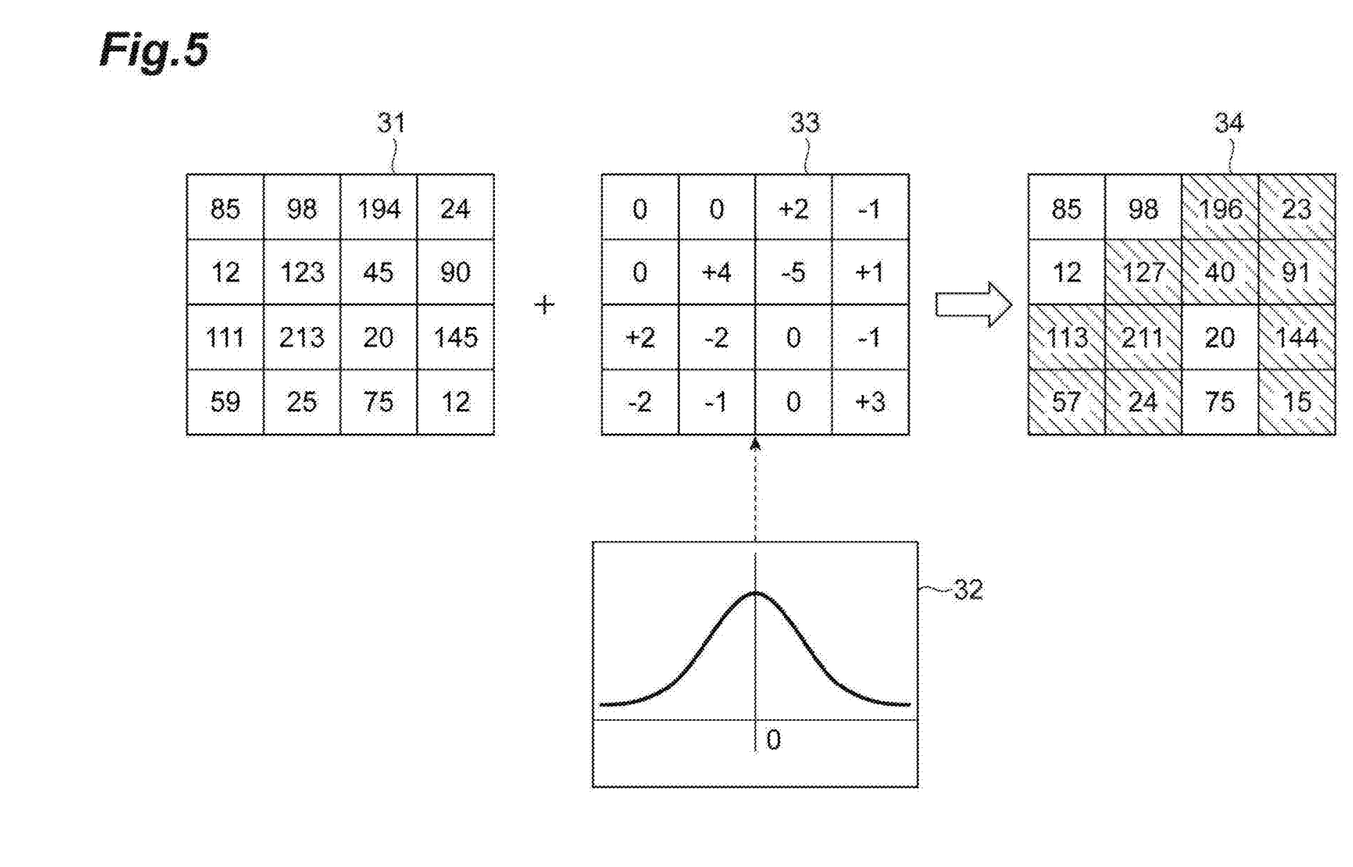
FIG. 5 is view showing an example of processing of generating a comparative image.

FIG. 5 is a view showing an example of processing of generating a comparison image. In this example, the generation unit 12 superimposes Gaussian noise 33 indicated by a normal distribution 32 on a target region 31 with 4 (pixels)×4 (pixels), and thereby generates a target region 34 that forms at least part of a comparison image. Because the luminous intensity of at least part of the target region 31 changes by this processing, noise occurs in the target region 34. In FIG. 5, pixels where the luminous intensity has changed by superposition of noise are indicated by hatching.

The generation unit 12 generates a plurality of comparison images while changing the standard deviation of the Gaussian noise. This means generating a plurality of comparison images with different densities (intensities) of random noise from each other. Setting of the standard deviation of the Gaussian noise and the number of comparison images are not particularly limited. For example, the generation unit 12 may generate a plurality of comparison images while changing the standard deviation to 2, 10, 18, 26, etc., or may generate a plurality of comparison images while changing the standard deviation to 2, 6, 10, 14, etc.

Then, the calculation unit 13 calculates the degradation level of each comparison image with respect to the input image (Step S14, calculation step). In this embodiment, the calculation unit 13 uses structural similarity (SSIM) as the degradation level. The SSIM is a technique and an index that estimate the similarity between two images by a product of a difference in average luminance, a difference in standard deviation of pixel value, and a covariance between pixels. In general, the SSIM is considered to be an index close to the human subjective decision. The SSIM between two images is a value between 0 and 1, and as its value is higher, the two images are more similar to each other.

When the SSIM in two images x and y is represented as SSIM(x,y), the SSIM(x,y) is obtained by the following Equation 1:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \quad (1)$$

The meaning of each variable in this equation is as follows.

$\mu_x$: average pixel value of image x
$\mu_y$: average pixel value of image y
$\sigma_x$: standard deviation of pixel value of image x
$\sigma_y$: standard deviation of pixel value of image y
$\sigma_{xy}$: covariance of images x, y
$c_1=(k_1L)^2, c_2=(k_2L)^2$: constant to stabilize an evaluation value even when a denominator value is extremely small. L is a dynamic range of a pixel value (255 in an 8-bit image). $k_1$ and $k_2$ are values that can be set arbitrarily, and their initial values are generally set to $k_1=0.01$ and $k_2=0.03$.

The calculation unit 13 calculates the SSIM between the input image (image x) and the comparison image (image y). In the example of FIG. 1, the calculation unit 13 at least calculates $SSIM_1$ obtained from the input image 21 and the comparison image 22, $SSIM_2$ obtained from the input image 21 and the comparison image 23, and $SSIM_3$ obtained from the input image 21 and the comparison image 24.

Then, the estimation unit 14 estimates the noise level of the input image based on a plurality of degradation levels (SSIM in this embodiment) (Step S15, estimation step). To be more specific, the estimation unit 14 calculates the relationship between the noise density and the degradation level and estimates the noise level based on this relationship. In this embodiment, the noise density (the standard deviation σ of the Gaussian noise) is used as the noise level. A method of estimating the noise level is not particularly limited.

For example, the estimation unit 14 may estimate the noise level by comparing a plurality of SSIM with a threshold. To be specific, the estimation unit 14 may calculate the relationship between the noise density (the standard deviation of the Gaussian noise) and the SSIM, and estimate the noise density when the SSIM coincides with the threshold, as the noise level. The estimation unit 14 can identify the noise density when the SSIM coincides with the threshold by obtaining a function representing the relationship between the noise density and the SSIM with use of the least squares method, the linear interpolation or the like. The threshold may be varied according to the input image.

Alternatively, the estimation unit 14 may approximate the relationship between the noise density (the standard deviation of the Gaussian noise) and the SSIM by a non-linear function, and estimate the noise level based on the leading coefficient of this non-linear function (to be more specific, the leading coefficient of a polynomial that defines the non-linear function). The non-linear function is not particularly limited, and it may be a quadratic function, a cubic function, or a higher-order function, for example. A method of approximation by the non-linear function is also not limited, and the least-squares method may be used, for example. When obtaining the non-linear function, the estimation unit 14 normalizes the SSIM. This normalization is processing to standardize the level of SSIM between images.

If the relationship between the noise density (the standard deviation of the Gaussian noise) and the SSIM of each image is represented by a graph when the noise level is the same or approximate between a plurality of images with different subjects, the degree of curve (the curvature) of each graph is almost similar to each other. On the other hand, the relationship between the noise density and the SSIM varies when the noise level is different even if an image is the same.

Figure 6:
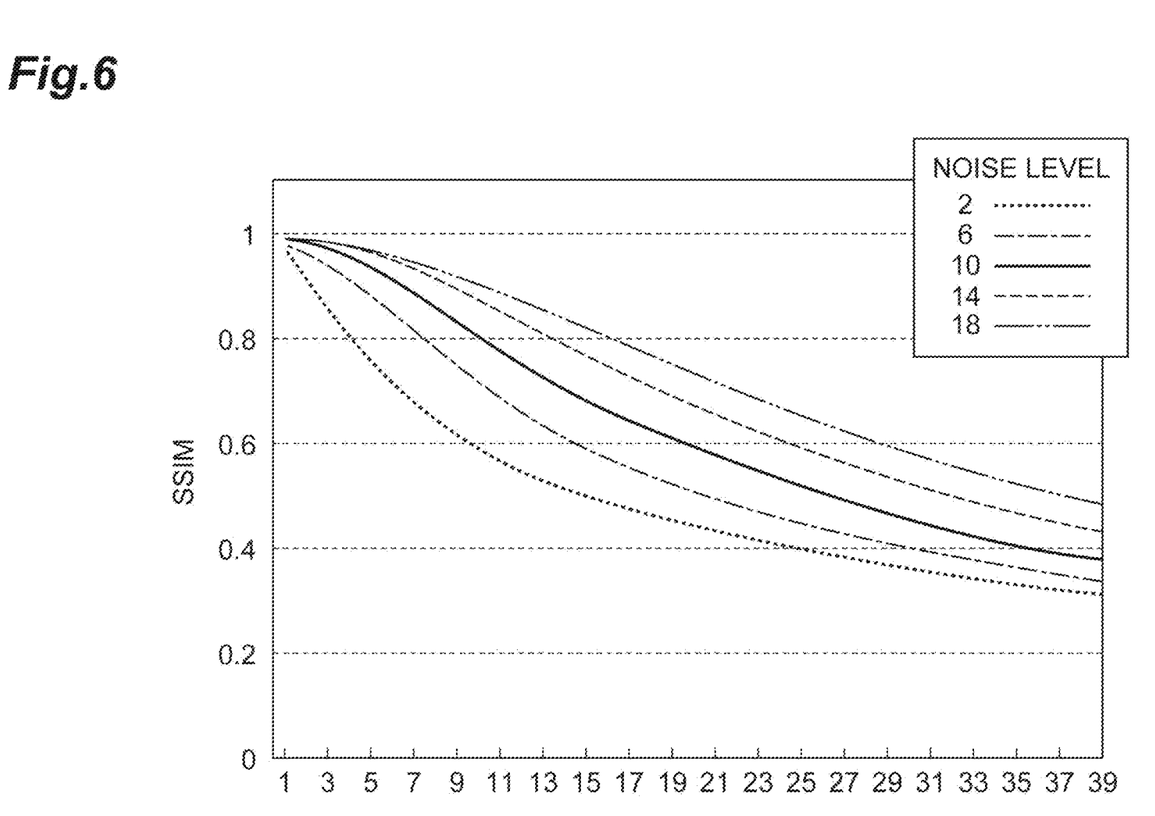
FIG. 6 is a view illustrating an example of estimation of a noise level.

FIG. 6 is a graph obtained by applying five types of noise levels (2, 6, 10, 14 and 18) to one image and then plotting the relationship between the noise density (the standard deviation of the Gaussian noise) and the SSIM for each of the noise levels. As shown therein, the curvature varies when the noise level is different even if the image is the same. When the noise level of the original image is low, the image quality begins to be degraded (the SSIM begins to decrease) at the point where random noise with low density is superimposed. On the other hand, when the noise level of the original image is high, the image quality is not degraded so much (the SSIM does not decrease so much) even if random noise with low density is superimposed. Thus, it is possible to estimate the noise level from the degree of decrease in the SSIM with an increase in the noise density. Because the curvature of the graph indicating a decrease in the SSIM is significantly dependent on the leading coefficient of a non-linear function, it is possible to estimate the noise level of various images based on a standardized reference by using this leading coefficient. When each of the graphs in FIG. 6 is approximated by the quadratic function "$y=ax^2+bx+c$", the estimation unit 14 estimates the noise level with use of the coefficient a.

Figure 7:
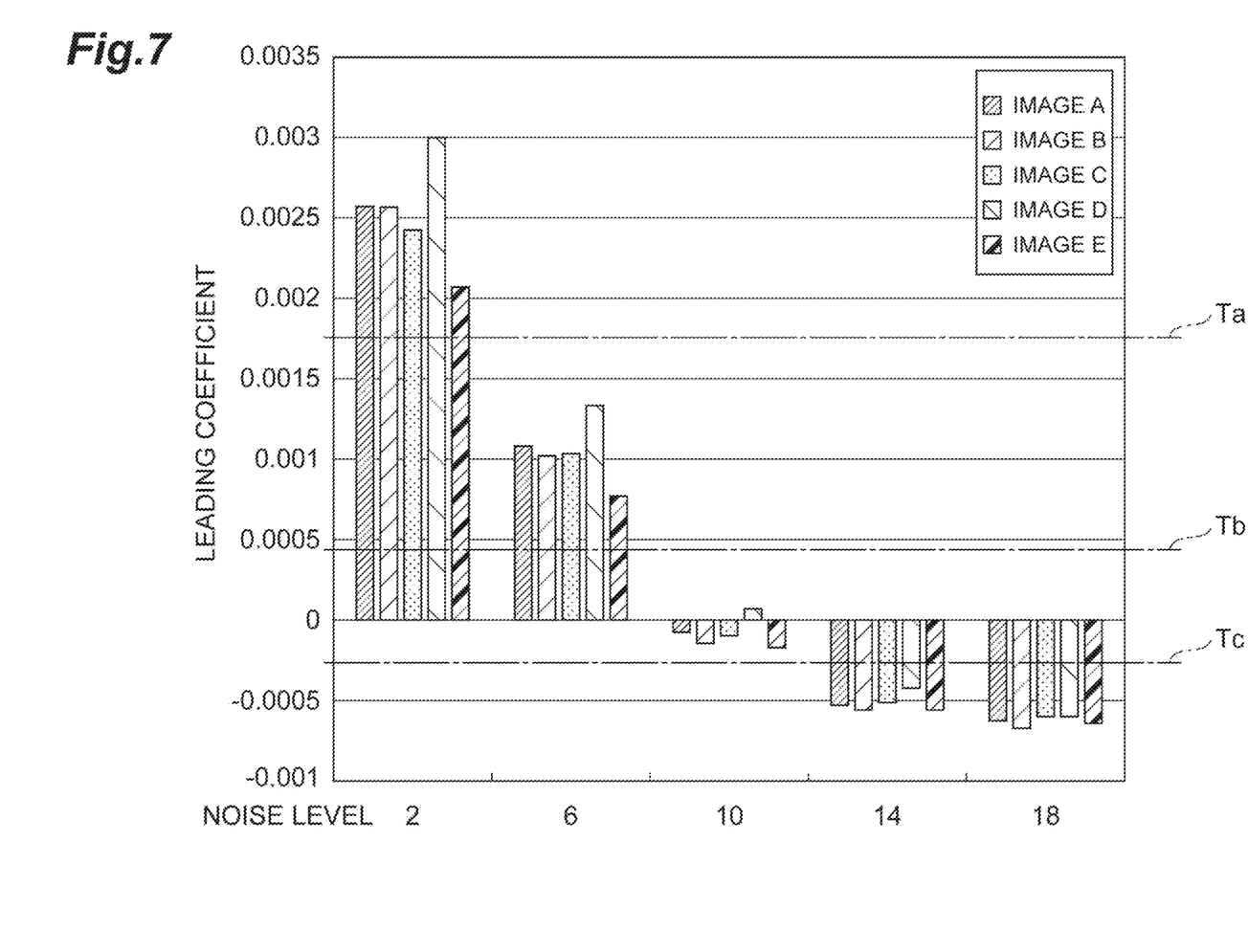
FIG. 7 is a view illustrating an example of estimation of a noise level.

FIG. 7 is a graph showing an example of the correspondence between the noise level and the leading coefficient of the quadratic function (the non-linear function representing the relationship between the noise density and the SSIM) for five types of images A to E. The horizontal axis of the graph corresponds to the noise level, and the vertical axis of the graph indicates the leading coefficient of the quadratic function. Each quadratic function approximates the relationship between the noise density and the SSIM, which is obtained by calculating the SSIM while changing the noise density (the standard deviation of the Gaussian noise) to 1, 2, 3, 4, etc. and normalizing each SSIM.

As shown in FIG. 7, the leading coefficient of the quadratic function (the non-linear function) obtained from the normalized SSIM is within a certain range according to the noise level regardless of the image type. Therefore, the noise level of the image can be determined by setting the correspondence between the leading coefficient and the noise level in advance and then determining to which noise level the obtained leading coefficient corresponds. A method of representing the correspondence is not particularly limited, and it may be represented by a table (correspondence table), for example. The image processing device 10 (e.g., the estimation unit 14) previously stores this correspondence. In the example of FIG. 7, the noise level is 2 when the leading coefficient is equal to or more than Ta, the noise level is 6 when the leading coefficient is equal to or more than Tb and less than Ta, the noise level is 10 when the leading coefficient is equal to or more than Tc and less than Tb, and the noise level is 14 when the leading coefficient is less than Tc.

The estimation unit 14 outputs the estimated noise level (Step S16). A method of outputting the noise level is not particularly limited. For example, the estimation unit 14 may store the noise level into a specified database, may transmit it to another computer, or may display it on a monitor. The estimation unit 14 may output a set of the noise level and the input image.

In the case where the image processing device 10 processes a plurality of input images, the processing of Steps S11 to S16 is repeated.

A method for using the estimated noise level is not particularly limited. For example, the noise level may be used for noise removal in the input image. By removing noise from the input image based on the estimated noise level, it is possible to improve the image quality of the input image. Further, by performing additional image processing such as super-resolution on the image from which noise is removed, it is possible to obtain a desired image without disturbance by noise. The additional image processing using the estimated noise level may be performed by the image processing device 10 or may be performed by another information processing device.

Program

Figure 8:
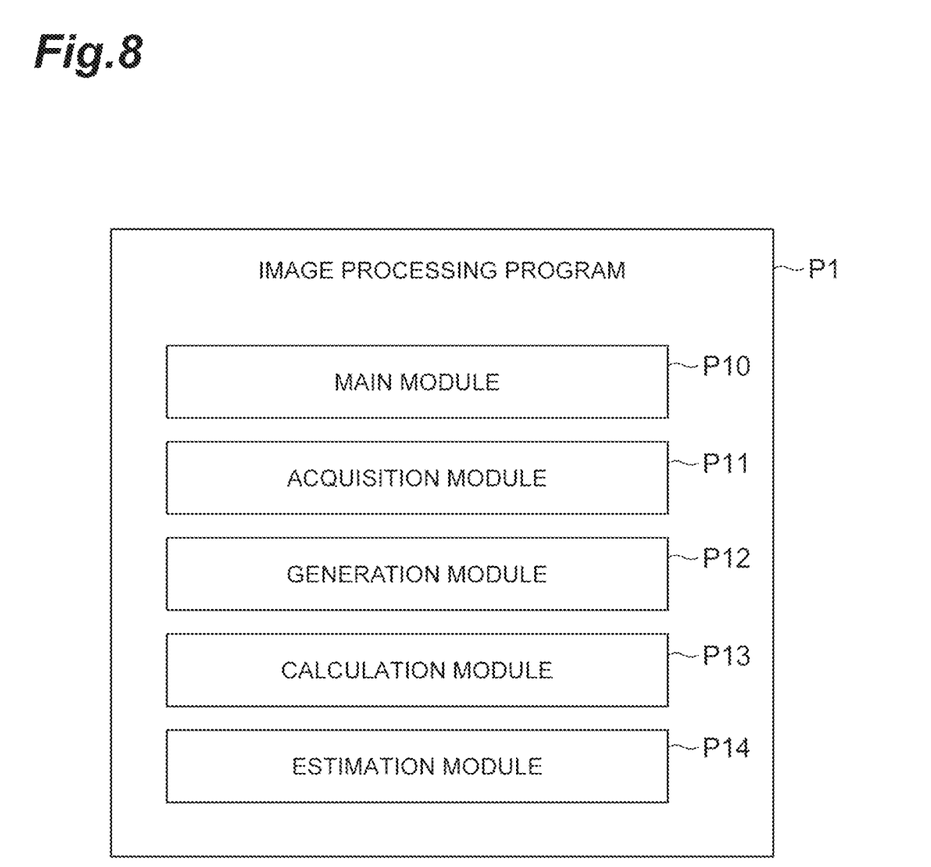
FIG. 8 is a view showing the configuration of an image processing program according to the embodiment.

An image processing program P1 that causes a computer to function as the image processing device 10 is described hereinafter with reference to FIG. 8. FIG. 8 is a view showing the configuration of the image processing program P1.

The image processing program P1 includes a main module P10, an acquisition module P11, a generation module P12, a calculation module P13, and an estimation module P14. The main module P10 is a part that exercises control over the estimation of the noise level. The acquisition unit 11, the generation unit 12, the calculation unit 13 and the estimation unit 14 are implemented by executing the acquisition module P11, the generation module P1, the calculation module P13, and the estimation module P14, respectively.

The image processing program P may be provided in the form of being recorded in a static manner on a tangible recording medium such as CD-ROM, DVD-ROM or semiconductor memory, for example. Alternatively, the image processing program P1 may be provided as a data signal superimposed onto a carrier wave through a communication network.

Advantageous Effects

As described above, an image processing device according to one aspect of the present invention includes an acquisition unit configured to acquire an input image, a generation unit configured to generate a plurality of comparison images by superimposing each of a plurality of noises with different densities from each other on a target region being at least part of the input image, a calculation unit configured to calculate, for each of the plurality of comparison images, a degradation level of the comparison image with respect to the input image, and an estimation unit configured to estimate a noise level of the input image based on a plurality of calculated degradation levels.

An image processing method according to one aspect of the present invention is an image processing method performed by an image processing device including a processor, the method including an acquisition step of acquiring an input image, a generation step of generating a plurality of comparison images by superimposing each of a plurality of noises with different densities from each other on a target region being at least part of the input image, a calculation step of calculating, for each of the plurality of comparison images, a degradation level of the comparison image with respect to the input image, and an estimation step of estimating a noise level of the input image based on a plurality of calculated degradation levels.

An image processing program according to one aspect of the present invention causes a computer to execute an acquisition step of acquiring an input image, a generation step of generating a plurality of comparison images by superimposing each of a plurality of noises with different densities from each other on a target region being at least part of the input image, a calculation step of calculating, for each of the plurality of comparison images, a degradation level of the comparison image with respect to the input image, and an estimation step of estimating a noise level of the input image based on a plurality of calculated degradation levels.

In the above-described aspects, a plurality of comparison images are obtained by superimposing a plurality of noises on an input image. The input image is not substantially degraded when noise with lower density than inherent noise of the input image is superimposed on the input image. On the other hand, the input image is degraded when noise with higher density than inherent noise of the input image is superimposed on the input image. With use of such characteristics related to noise, by generating a plurality of comparison images from an input image and estimating the noise level of the input image using those comparison images, it is possible to estimate the absolute (or intrinsic) noise level of the input image without prior information. When a target image is the entire input image, it is possible to obtain the noise level of the entire image rather than the local noise level of the image.

In an image processing program according to another aspect, the degradation level may be structural similarity. Because the SSIM is an index based on variations related to each of luminance, contrast and structure, it is suitable for estimation of the noise level using the comparison image obtained by superimposing noise on the input image. Thus, use of the SSIM enables accurate estimation of the noise level of the input image.

In an image processing program according to another aspect, the estimation unit may estimate the noise level by comparing the plurality of degradation levels with a threshold. By using the threshold, it is possible to estimate the noise level in simple processing and at high speed.

In an image processing program according to another aspect, the estimation unit may estimate the noise level based on a leading coefficient of a non-linear function representing a relationship between the density and the degradation level. The curvature of a graph indicating this non-linear function tends to vary according to the noise level regardless of the subject of the image, and the curvature is significantly dependent on the leading coefficient of the non-linear function. It is thereby possible to accurately determine the noise level based on the leading coefficient.

In an image processing program according to another aspect, a correspondence between the leading coefficient and the noise level may be set in advance, and the estimation unit may calculate the leading coefficient of the non-linear function from the plurality of densities and the plurality of degradation levels, and determine the noise level corresponding to the calculated leading coefficient by referring to the correspondence. By using the correspondence prepared in advance, it is possible to easily obtain the noise level from the leading coefficient.

Modified Example

An embodiment of the present invention is described in detail above. However, the present invention is not limited to the above-described embodiment. Various changes and modifications may be made to the present invention without departing from the scope of the invention.

Although the image processing device 10 uses the SSIM as the degradation level in the above-described embodiment, another index may be used as the degradation level.

Although the image processing device 10 uses the Gaussian noise in the above-described embodiment, the type of noise to be superimposed on the input image is not limited thereto. For example, the image processing device may superimpose another type of random noise on the input image.

Although the noise density (the standard deviation of the Gaussian noise) is set as the noise level in the above-described embodiment, a method of setting the noise level is not limited thereto. For example, the estimation unit may obtain the noise level from the noise density by predetermined operation.

The procedure of the image processing method that is performed by at least one processor is not limited to the example shown in the above embodiment. For example, some of the above-described steps (processing) may be skipped, or the steps may be performed in a different order. Further, any two or more steps of the above-described steps may be combined, or some of the steps may be modified or eliminated. Alternatively, another step may be performed in addition to the above-described steps.

REFERENCE SIGNS LIST

10 . . . image processing device, 1 . . . acquisition unit, 12 . . . generation unit, 13 . . . calculation unit, 14 . . . estimation unit, P1 . . . image processing program, P10 . . . main module, P11 . . . acquisition module, P12 . . . generation module, P13 . . . calculation module, P 14 . . . estimation module

The invention claimed is:

1. An image processing device comprising:

at least one memory operable to store program code; and at least one processor operable to read the program code and operate as instructed by the program code, the program code being configured to cause the at least one processor to:

acquire an input image;

generate a plurality of comparison images by superimposing each of a plurality of noises with a plurality of densities from each other on a target region being at least part of the input image; and estimate a noise level of the input image based on a plurality of degradation levels obtained by calculating, for each of the plurality of comparison images, a degradation level of a comparison image with respect to the input image, wherein the program code is further configured to cause the at least one processor to estimate the noise level based on a leading coefficient of a non-linear function representing a relationship between a density of a noise and the degradation level, wherein a correspondence between the leading coefficient and the noise level is set in advance, and wherein the program code is further configured to cause the at least one processor to calculate the leading coefficient of the non-linear function from the plurality of densities and the plurality of degradation levels, and determine the noise level corresponding to the calculated leading coefficient by referring to the correspondence.

2. An image processing method performed by an image processing device including a processor, comprising:

acquiring an input image;

generating a plurality of comparison images by superimposing each of a plurality of noises with a plurality of densities from each other on a target region being at least part of the input image; and estimating a noise level of the input image based on a plurality of degradation levels obtained by calculating, for each of the plurality of comparison images, a degradation level of a comparison image with respect to the input image, wherein the estimating the noise level includes estimating the noise level based on a leading coefficient of a non-linear function representing a relationship between a density of a noise and the degradation level, wherein a correspondence between the leading coefficient and the noise level is set in advance, and wherein the estimating the noise level based on the leading coefficient includes calculating the leading coefficient of the non-linear function from the plurality of densities and the plurality of degradation levels, and determining the noise level corresponding to the calculated leading coefficient by referring to the correspondence.

* * * * *